June 13, 1967 J. H. PRAGER 3,325,111

TAPE REEL DRIVE

Filed Nov. 10, 1964

INVENTOR.
JAY H. PRAGER
BY
EDWARD D. O'BRIAN
ATTORNEY

United States Patent Office 3,325,111

Patented June 13, 1967

3,325,111
TAPE REEL DRIVE

Jay H. Prager, 4210 Lankershim Blvd., North Hollywood, Calif. 91602

Filed Nov. 10, 1964, Ser. No. 413,390
2 Claims. (Cl. 242—55.13)

This invention is directed to a tape reel drive of particular utility where external power is not available to drive the tape take-up reel.

Audio reproducers from magnetic tape medium are well known in the art and are widely used in the production of continuous music in places of business in order to set a mood within the place of business. Such reproducing equipment is of such nature as to accept a cartridge of tape. The reproducing equipment, independently of the cartridge, carries tape advance means and magnetic reproducing heads to read the magnetic tape on a signal. The present cartridge provides a guide means to carry the tape past the magnetic reproducing heads and past the tape advance means. The cartridge also contains tape storage means. In the present cartridges the tape is of continuous nature so that it may be continuously advanced past the magnetic reproducing heads without rewinding. However, the tape storage for this relatively long length of tape causes manifold difficulties. The tape storage requires special, low friction tape so that the tape may slide against itself and against the exterior of the tape storage can. Such rubbing causes extensive tape wear and, of course, tape tangles are common.

The tape reel drive of this invention is particularly designed as an improvement over such continuous tape cartridges and is particularly designed to replace them in the standard, presently commercially available reproducing equipment.

Accordingly, it is an object of this invention to provide a tape reel cartridge which is directly insertable into the presently available tape cartridge reproducing equipment and which cartridge employs separate tape unwinding and winding reels.

It is another object of this invention to provide tape take-up reel drive means to drive a tape take-up reel at least partially from the energy supplied by the tape unwinding from a tape let-off reel.

It is another object of this invention to provide spring and gearing inter-connection between a tape let-off reel and a tape take-up reel so that the take-up reel is stressed with respect to the let-off reel to a sufficient degree and for a sufficient number of turns to permit the take-up reel to wind the tape which is unwound from the let-off reel.

Other objects and advantages of this invention will become apparent from a study of the following portion of the specification, the claims and the drawings in which:

As an aid to understanding this invention it can be stated in essentially summary form that it is directed to a tape reel drive. In the cartridge environments for which this tape reel drive is directed, and in some other environments, no external force is available to drive the tape reel. In accordance with this invention the unit comprises a take-up reel and is adapted to carry as a tape supply and let-off reel a standard reel which is installed in the unit already wound with prerecorded commercially available standard music tape. The tape is positioned over the necessary guides to carry the tape past the reproducing heads and through the tape advance structure and is secured to the take-up reel. The take-up reel is preferably installed as a permanent part of the structure, but should space so permit a reel of standard nature may be used for take-up, and the drive structure of this invention can be separately positioned. However, in the restricted space environment of present tape cartridges it is considered necessary to use a special take-up reel with part of the mechanism positioned therein.

Such cartridges are not provided with drive means to wind the take-up reel and accordingly the tape reel drive of this invention comprises a spring acting between the take-up reel and the let-off reel to stress the take-up reel in winding direction with respect to the let-off reel. In order to minimize the size of the spring necessary to permit the needed relative number of turns, gearing is positioned between the spring in one of the reels so as to increase the number of effective turns the take-up reel can be torqued with respect to the let-off reel. Furthermore, the unwinding of the tape from the let-off reel winds the spring in the direction which urges winding on the take-up reel.

Figure 1:
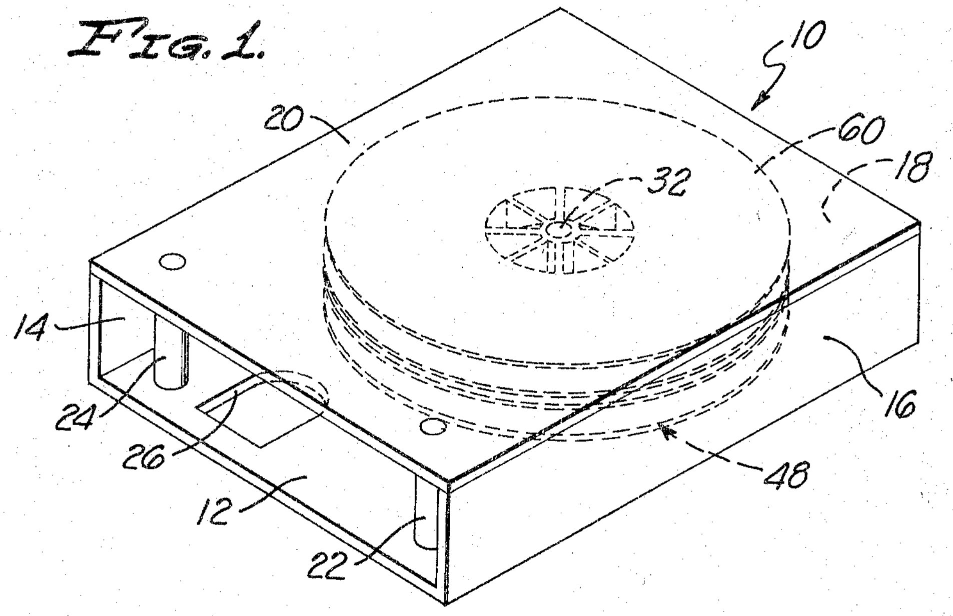
FIG. 1 is an isometric view of a magnetic tape cartridge employing the tape reel drive of this invention.

This invention will be understood in greater detail by reference to the following portion of the specification, wherein the drawings are described. Referring now to FIG 1, a cartridge unit employing the tape reel drive of this invention is generally indicated at 10. The cartridge 10 has a permanent bottom 12, left and right sides 14 and 16, as viewed from the front, and back 18. The cartridge 10 has a front end which is at least partially open to permit access of the magnetic tape reproducing heads to the tape and to permit access of the tape advancing structure to the tape. The tape cartridge 10 is fitted with a removable top cover 20 and with guide rollers 22 and 24 which guide the magnetic tape in proper relationship to the magnetic reproducing heads and to the tape advance structure. The tape advance structure includes a drive backup roller which swings up into the interior of the cartridge 10 through opening 26 provided in the bottom thereof. Furthermore, guide rollers 22 and 24 act to properly guide the tape from the let-off reel to the take-up reel.

Figure 2:
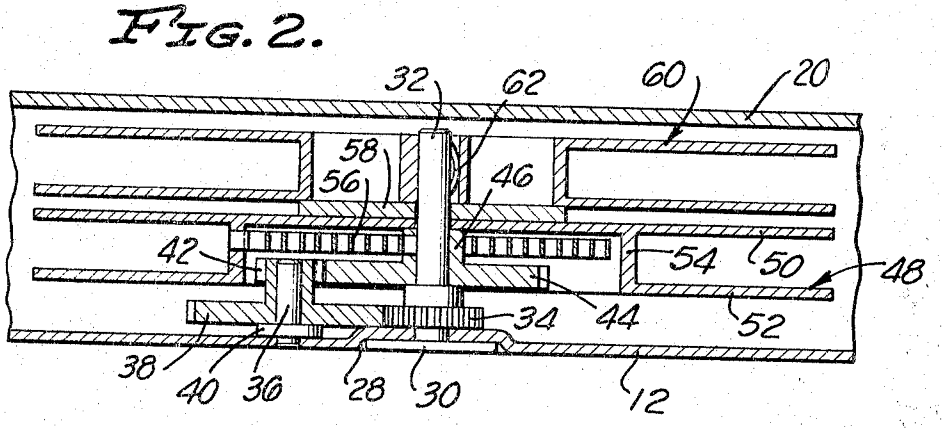
FIG. 2 is a section taken generally through the center line of the tape reel drive of this invention.

The particular structure of the tape reel drive is indicated in the section of FIG. 2 which is a generally vertical longitudinal section through the cartridge 10. As is seen in FIG. 2, the bottom of the cartridge 12 is provided with a recess 28 which accepts flange 30 fixed to the bottom end of center shaft 32. Center shaft 32 is mounted in an appropriate bearing in the bottom 12 so as to permit its rotation with respect thereto. Shaft 32 carries pinion 34 fixed thereto.

Counter shaft 36 carries gear 38 which is in engagement with pinion 34. Flange 40 holds gear 38 in proper axial relationship to maintain engagement with pinion 34. As is shown, counter shaft 36 is rigidly fixed to the take-up reel 48, or may be rotatably mounted with respect thereto, if desired. Secured so as to rotate with gear 38 is pinion 42. Pinion 42 is in engagement with gear 44 which is secured to hollow shaft 46. Hollow shaft 46 is mounted around center shaft 32 in rotatable relationship thereto.

Mounted around hollow shaft 46 and rotatable with respect thereto is magnetic tape take-up reel 48. Reel 48 is provided with flanges 50 and 52 to permit winding of magnetic tape upon core 54 in conventional manner. Flat coil spring 56 is positioned within the core 54 and has its outer end secured with respect to core 54. The interior end of coil spring 56 is secured to hollow shaft 46.

Spacer washer 58 is positioned over take-up reel 48 and around shaft 32 so as to be rotatable with respect thereto. Shaft 32 extends upward out of spacer washer 58 and terminates in an upper end thereabove. Tape let-off reel 60 is positioned upon the upper end of center shaft 32 and is made irrotatable with respect thereto by means of a conventional spring key 62 secured to the shaft 32. Let-off reel 60 is preferably of conventional commercial design and is of the nature on which tape is commercially sold. The upper end of shaft 32, including the spring key 62, is of such nature that conventional tape reel 60 may be installed thereon.

The cartridge 10 of the structure of this invention is made ready for use in the magnetic tape reproduction equipment by first providing a standard commercial reel 60 upon which is wound magnetic tape having signals corresponding to the desired audio to be replayed. The top 20 of the cartridge 10 is removed and the reel 60 is placed on the top of shaft 32 in engagement with spring key 62 so that reel 60 is irrotatably mounted with respect to shaft 32. The reel 60 is mounted so that it unwinds in the clockwise direction, when viewed from the top. Thereupon, the take-up reel 48 is restrained from rotation and reel 60 is rotated in the clockwise direction, the direction in which it normally unwinds, until the spring 56 is wound substantially tight. Thereupon, the end of the tape is lead around roller 22 and then around roller 24 and is attached to take-up reel 48 for the winding thereof. The attachment to reel 48 can conveniently be managed by having a permanently attached leader on the core 54 and attaching the end of the tape to this leader. Both reels 48 and 60 are then released and the spring tension of spring 56 immediately turns the reels to pull the tape tight therebetween. The cover 20 is then replaced upon the cartridge and the cartridge is inserted into the tape reproduction equipment when it is desired that this particular tape be played.

During playing the tape advance mechanism unwinds tape from the reel 60 and causes it to turn in the direction to tighten spring 56. At the same time, reel 48 is winding tape which has just come off of the tape heads and is being moved by the tape advance. The spring stress on reel 48 causes torque in the direction to cause winding of this tape. Reel 48 rotates in such a direction during the winding operation as to cause reduction in the tension of spring 56. Thus, winding of the spring is accomplished by reel 60 and such winding is utilized by reel 48. Of course, at the start of play of the new tape, reel 48 rotates at a considerably faster speed than the reel 60 and it is this time that the gearing becomes of especial significance. Due to the gearing ratios, which are especially chosen for that purpose, the number of turns which the spring 56 is able to rotate shaft 46 with respect to reel 48 is multiplied by the gearing to shaft 32 so that reel 48 may turn many more turns with respect to shaft 32 than the spring alone can provide. Thus, the number of effective turns available from spring 56 is substantially increased. The gearing is chosen so that reduction in spring tension continues until a substantially equal diameter of tape is wound upon each of the reels. At that point the tension of spring 56 is at a minimum, and at that point also the rotative speed of reel 60 becomes greater than the rotative speed of reel 48 so that an increase in tension in the spring 56 is again accomplished. At the end of the forward winding, the spring 56 is again wound substantially to its maximum tension due to this increased rotative speed of reel 60.

At the end of tape play in the first direction of operation, reversal of motion of tape direction can be accomplished either manually or automatically. In a manual reverse situation, such can be accomplished in either of two ways, depending on the type of equipment in which the cartridge is used. In the first case, the cartridge is removed, turned over and reinserted so that the equipment again advances the tape past the heads (which read different tracks than in the first traverse) and winds the tape on the original reel.

In the second case, the tape capstan drive is simply reversed, either automatically or manually, appropriate tape reading beads are electrically switched and the signal is read from the tape as it is advanced back to the original reel. In either case the tape reel drive of this invention provides sufficient tape tension for proper winding.

The invention having been described in its preferred embodiment, it is clear that it is susceptible to numerous changes and modifications within the inventive concept. Accordingly, this invention is defined by the scope of the following claims.

I claim:

1. A tape reel drive, said tape reel drive comprising:

a tape reel cartridge, said tape reel cartridge having a housing;

a center shaft mounted on said housing so as to be rotatable with respect thereto, a pinion mounted on said center shaft, said center shaft being adapted to irrotatably carry a tape filled let-off reel thereon so that the tape let-off reel is rotatable with rotation of said center shaft;

a counter shaft mounted with respect to said housing, a counter shaft pinion and a counter shaft gear mounted on said counter shaft so as to be rotatable with respect to said housing, said counter shaft gear being in engagement with said center shaft pinion;

a spring drive gear, said spring drive gear being rotatably mounted with respect to said center shaft, said spring drive gear being in engagement with said counter shaft pinion so that upon rotation of said center shaft with respect to said housing, said spring drive gear rotates with respect to said housing;

a take-up reel, said take-up reel being rotatably mounted with respect to said center shaft, a spiral spring connected to said spring drive gear and to said take-up reel so that upon rotation of said center shaft with respect to said housing, said take-up reel is urged to rotate.

2. The tape reel drive of claim 1 wherein said spiral spring, said counter shaft pinion, and said spring drive gear are located within said take-up reel.

References Cited

UNITED STATES PATENTS

| | | | |
|---|---|---|---|
| 2,869,799 | 1/1959 | Hunter | 242—55 X |
| 2,971,715 | 2/1961 | Mitchell | 242—55 |
| 2,996,264 | 8/1961 | Bygdnes | 242—55 |
| 3,219,290 | 11/1965 | Delin | 242—55 |

FOREIGN PATENTS

| | | |
|---|---|---|
| 65,169 | 12/1946 | Denmark. |

STANLEY N. GILREATH, *Primary Examiner.*

GEORGE F. MAUTZ, *Assistant Examiner.*